March 5, 1968   MICHIO SUZUKI ETAL   3,372,063
METHOD FOR MANUFACTURING AT LEAST ONE ELECTRICALLY
ISOLATED REGION OF A SEMICONDUCTIVE MATERIAL
Filed Dec. 17, 1965                                    2 Sheets-Sheet 1
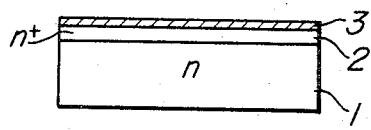
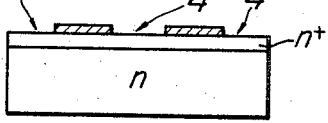
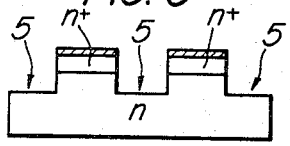
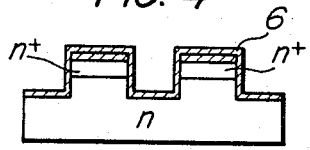
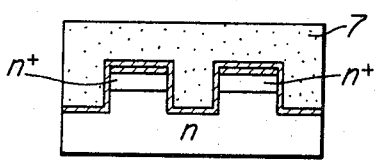
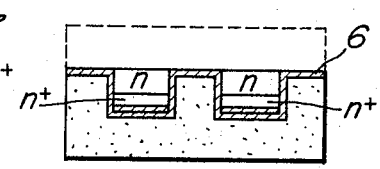
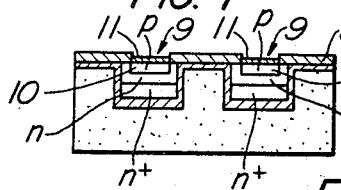
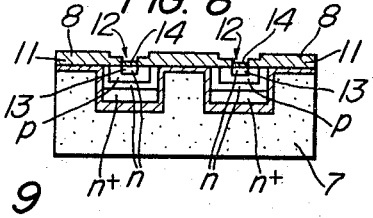
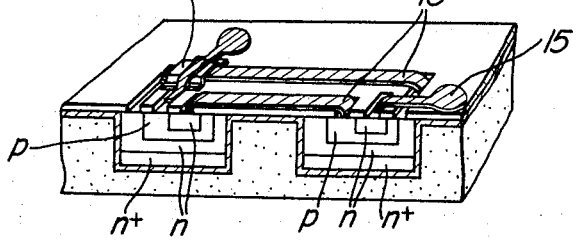
INVENTORS
MICHIO SUZUKI
SHOJI TAUCHI
BY Paul M. Craig, Jr.
ATTORNEY

United States Patent Office 3,372,063
Patented Mar. 5, 1968

3,372,063
METHOD FOR MANUFACTURING AT LEAST ONE ELECTRICALLY ISOLATED REGION OF A SEMI-CONDUCTIVE MATERIAL
Michio Suzuki, Hachioji-shi, and Shoji Tauchi, Kokubunji-shi, Japan, assignors to Hitachi, Ltd., Tokyo, Japan, a corporation of Japan
Filed Dec. 17, 1965, Ser. No. 514,481
Claims priority, application Japan, Dec. 22, 1964, 39/72,006
9 Claims. (Cl. 148—1.5)

ABSTRACT OF THE DISCLOSURE

A method for manufacturing at least one electrically isolated region of a semiconductive material, comprising the steps of depositing a first insulating layer in a predetermined pattern upon a substrate of monocrystalline semiconductive material, growing a semiconductive layer over both the exposed substrate and the insulating layer, whereby a monocrystalline layer is formed upon the exposed substrate and a polycrystalline layer is formed upon the insulating layer, subsequently, chemically etching both the monocrystalline and polycrystalline layers until the latter is completely removed while the former is only somewhat reduced in thickness, next applying a second insulating layer over both the exposed first insulating layer and the monocrystalline layer, and finally, depositing a material of high thermal conductivity over said second insulating layer and removing the semiconductor substrate.

---

This invention relates to a novel method for disposing semiconductor materials or semiconductor devices in a layer of electrically insulating material. More particularly, the present invention contemplates a novel method by which diodes, transistors or solid circuit devices recently being more and more developed in the art of electronics can be disposed in an electrically insulating material in electrically completely isolated relation from one another and an electric circuit can be formed as required by connecting these devices with one another by an electrial conductor.

In a solid circuit having a plurality of semiconductor devices including transistors, diodes, resistors, capacitors and the like built in a single semiconductor body, these devices or composite devices comprising a combination of a plurality of these devices are electrically isolated from one another, and where electrical connection is to be made between the above devices or composite devices thereof, there is a necessity for separately providing such electrical connection. According to prior practice, PN junctions are formed in a semiconductor substrate by selective diffusion of impurities by use of a mask of an oxide film and the high resistivity characteristic of the PN junctions in their backward direction are utilized to obtain the desired electrical isolation. In order to attain complete isolation, it is necessary to increase the backward breakdown voltage of the junctions, to reduce the leak current through the junctions and to lower the electric capacitance of the junctions. The solid circuit thus obtained has generally been defective in that the circuit arrangement becomes complicated due to stray capacitance of the junctions and this circuit can not be satisfactorily used with a high-speed computer or the like because the time constant cased by the capacitance provides a hindrance to a high-speed operation.

In an effort to utilize the solid circuit for operation at high frequencies or to utilize it as a high-speed switching circuit, an improved technique for electrical isolation of semiconductor devices from one another has been developed. An integrated circuit obtained by this improved technique is quite suitable for use at high frequencies since semiconductor devices therein are completely isolated from one another by insulating material and there is substantially no flow of leak current, but this method has still had great defects that manufacturing steps involved therein are quite complicated and the integrated circuit obtained thereby does not have a satisfactory degree of precision, hence a low rate of product yield has been unavoidable.

With a view to eliminate the above-described defects, it is the primary object of the present invention to provide a novel method for independently disposing a semiconductor material in a layer of electrically insulating material.

Another object of the present invention is to provide a novel method for making semiconductor devices consisting of transistors, diodes, resistors, capacitors or a combination of these elements by causing an active impurity to selectively diffuse into the semiconductor material independently disposed in the electrically insulating material.

A further object of the present invention is to provide a method for making a desired electric circuit by electrically connecting between the semiconductor devices independently disposed in the electrically insulating material.

The above and other objects, advantages and features of the present invention will become apparent from the following description with reference to the accompanying drawings, in which:

FIGS. 1 through 9 are explanatory views showing the successive steps of solid circuit manufacture according to a prior method of electrical isolation;

Figure 10:
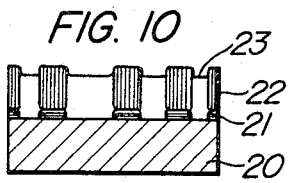
FIGS. 10 through 13 are explanatory views showing the manufacturing steps of a solid circuit device according to the method of this invention representing a case in which a silicon substrate is used.
Figure 14:
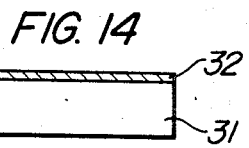
FIGS. 14 through 17 are similar explanatory views showing a case in which a germanium substrate is used.

Before giving a detailed description with regard to the method embodying the present invention, a typical process employed in the prior electrical isolation technique will first be described with reference to FIGS. 1 through 9 so that the invention can more clearly be understood. In the prior process, a substrate 1 of, for example, N-type silicon is first prepared and a silicon layer 2 of same conductivity type and having a lower resistivity than the substrate 1 is made to epitaxially grow on the substrate 1, then a silicon dioxide film 3 is deposited on the silicon layer 2 as shown in FIG. 1. A method known in the field of semiconductor industry as the photo-resist technique is then applied to the silicon dioxide film 3 to remove predetermined portions as at 4 of the silicon dioxide film 3 to thereby partially expose the epitaxial growth layer 2 as shown in FIG. 2. The silicon substrate is then immersed in an etchant consisting essentially of fluoric acid and nitric acid so that those portions of the silicon epitaxial growth layer 2 and the silicon substrate 1 which are not covered with the silicon dioxide film 3 are etched to form recesses 5 as shown in FIG. 3. A silicon dioxide film 6 of predetermined thickness is then deposited on the etched surface, for example, by the method of thermal decomposition of tetraethoxy silane as shown in FIG. 4. Silicon is subsequently deposited on this silicon dioxide film 6 as shown in FIG. 5 by means of evaporation or by reducing $SiCl_4$ by hydrogen. This silicon deposited layer 7 consists of polycrystalline silicon and serves as a substrate crystal from which a solid circuit is manufactured by later steps.

The silicon substrate 1 of single crystalline structure originally included in the assembly of FIG. 5 is lapped until the silicon dioxide layer 6 is exposed as shown in FIG. 6, in which it will be apparent that the single crystalline layer of silicon is completely separated into a plurality of independent sections by the silicon dioxide layer 6. A method commonly called the planar technique is then applied to this assembly to form an integrated circuit therefrom. Or more precisely, a silicon dioxide film 8 is deposited on the entire surface of the substrate of FIG. 6, and the photo-resist technique is again applied thereto to bore holes 9 in the silicon dioxide film 8 as shown in FIG. 7. A P-type impurity such as boron is then diffused into the substrate through these holes 9 to form transistor base regions 10. Silicon dioxide films 11 are formed during this operation. Thereafter in order to form transistor emitter regions 13, the photo-resist technique is again employed to bore holes 12 through the newly deposited silicon dioxide films 11, and an N-type impurity such as antimony or phosphorus is diffused through the holes 12 to make the emitter regions 13 as shown in FIG. 8. Silicon dioxide films 14 are formed during the diffusing operation of the N-type impurity. In this manner, it is possible to give electrical properties such as of transistors, diodes or the like to the single crystalline silicon regions separated from each other by the silicon dioxide layer 6.

In forming an integrated circuit (also called a solid circuit) from these independent electric devices by suitably electrically connecting them with each other, the photo-resist technique is again employed to bore holes through predetermined portions of the silicon dioxide films 8, 11 and 14 used as the mask for the selective diffusion of impurities so as to partially expose the single crystalline silicon layer, and the exposed portions are suitably connected with an electric conductor so as to provide a desired circuit configuration. Such electrical connection is generally provided by evaporation of a metal since the substrate per se of an integrated circuit is generally very small in size and it is extremely difficult to connect semiconductor devices built therein by means of lead wires. FIG. 9 shows an example of such integrated circuit having evaporated metal leads 15. If the evaporated metal leads 15 should cross with each other, a silicon dioxide film 16 or the like insulates these leads.

The above-described process for obtaining an integrated circuit by electrical isolation of semiconductor devices has been defective as described previously though it can advantageously be utilized for high frequency applications by virtue of little leak current.

The invention which eliminates the defects involved in the prior process will hereunder be described in detail. Briefly, the present invention is based on the findings that, while a vapor growth layer of semiconductor grown on a single crystalline substrate of semiconductor has a single crystalline structure, a vapor growth layer grown on an ordinary metal or a silicon dioxide layer becomes polycrystal. Further, it is found that, on a vapor growth layer of semiconductor grown on a single crystalline substrate of semiconductor at a temperature more than a certain value, a single crystalline vapor growth layer can be formed at a lower temperature, and simultaneously with the formation of the single crystalline vapor growth layer, a polycrystalline vapor growth layer is formed on the semiconductor substrate. Meanwhile, it is recognized that a chemical etchant commonly used for the surface treatment or for the revealing of etch pits shows a considerably different etch rate depending on the structure of the semiconductor either single crystalline or polycrystalline. For example, when a silicon crystal is etched by a chemical etchant obtained by dissolving 10 grams of chromic anhydride into 20 cc. of water and adding 40 cc. of fluoride acid to the solution, the etch rate is $3.2\mu$ per minute in the case of single crystalline structure and is $6.4\mu$ per minute in the case of polycrystalline structure. In case of germanium crystals, the etch rate with the same solution is $0.17\mu$ per minute in the case of single crystalline structure and is $0.38\mu$ per minute in the case of polycrystalline structure.

A similar effect can be obtained with vapor etching with HCl gas though the effect is not so marked as with the chemical etchant as described above. When a layer of a metal such as tungsten or a silicon dioxide layer is partly deposited on a single crystalline substrate of semiconductor by means such as evaporation or photo-resist technique and a vapor growth layer of semiconductor material is deposited on the entire surface of the semiconductor crystal, both of a single crystalline layer and a polycrystalline layer grow on this crystal. By thereafter applying an etching treatment thereto with a chemical etchant, the polycrystalline layer is more rapidly etched than the single crystalline layer, and after a certain time, independent portions of the single crystalline vapor growth layer of desired size and thickness are solely left on the semiconductor body. An electrically insulating material such as silicon dioxide is then deposited on the entire surface of the specimen to a thickness which can completely cover the semiconductor layer. Thus, the independent portions of the vapor growth layer are completely separated from one another by the insulating material. Thereafter, a layer of a metal such as aluminum may be evaporated on the above-described insulating material layer as required in order to provide convenience of subsequent working, to give ease of attaching the specimen to the stem or to increase the thermal dissipation effect of the semiconductor devices. The specimen is then subjected to lapping by an abrasive, etching with a chemical etchant, vapor etching or like treatment or a combination of these treatments so as to remove the substrate crystal to an extent that the vapor growth layer is completely exposed. By the above treatment, it is possible to obtain a structure in which the independent portions of the vapor growth layer are exposed on the specimen surface and isolated from one another by the insulating material layer. In obtaining a solid circuit from the above specimen, an impurity may be diffused into the vapor growth layer of semiconductor remaining in the insulating material layer to provide electric properties such as of PN junctions to thereby obtain transistors, resistors or capacitors, and these devices may suitably be electrically connected with one another by means such as evaporation of a metal conductor.

A preferred form of the method according to the invention will be described with reference to FIGS. 10 through 13 to show how a solid circuit is manufactured according to the invention. In FIGS. 10 through 13, parts are shown in an enlarged scale for the convenience of explanation.

A semiconductor body 20 has the (111) crystal face and is cut from an N-type silicon single crystal having a resistivity of 10 ohm-centimeters. The resistivity of the body crystal may suitably be selected depending on design conditions of a solid circuit, but use of a crystal having a relatively high resistivity is desirable in order to prevent diffusion of an impurity into a vapor growth layer that may later be grown on the substrate. As shown in FIG. 10, a silicon dioxide layer 21 with a thickness of $1.5\mu$ is deposited on the silicon body 20 by the method of thermal decomposition of tetra-ethoxy silane. Then, by use of a mask of desired pattern and the commonly employed photo-resist technique, those portions of the silicon dioxide layer 21 except the desired portions are removed. A vapor growth layer of silicon is then deposited on the substrate by the method of reduction of $SiCl_4$ by hydrogen. By this vapor growth treatment, single crystals 23 grow on the silicon body 20 and polycrystals 22 grow on the silicon dioxide layer 21. The vapor growth layer with a thickness of $50\mu$ could be obtained at a vapor growth temperature of 1200° C. and duration of 9 minutes. Attention that should be given in connection with the above treatment is that the surface of the silicon body 20 is vapor-etched in a hydrogen atmosphere prior to the vapor growth of silicon in order to clean the surface of the silicon body 20, but the duration of this hydrogen treatment may preferably be as short as possible because the silicon dioxide layer would gradually be reduced in this hydrogen treatment.

Figure 11:
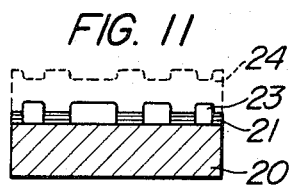
Figure 12:
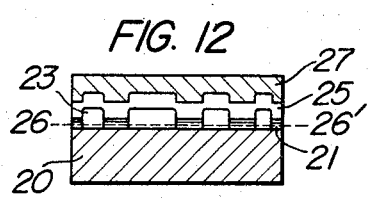

The vapor growth layers 22 and 23 are subjected to an etching treatment for 8 minutes with an etchant of the composition as described previously, that is, the solution obtained by dissolving 10 grams of chromic anhydride into 20 cc. of water and adding 40 cc. of fluoric acid thereto. By this etching treatment, the polycrystalline silicon layer 22 is completely etched, but the single crystalline silicon layer 23 is left to have a thickness of about 25μ as shown in FIG. 11. A silicon dioxide layer 25 is again deposited on the above crystals by the thermal decomposition of tetra-ethoxy silane as shown in FIG. 12. By the thermal decomposition of tetra-ethoxy silane at a temperature of 720° C. for 12 hours, the silicon dioxide layer 25 of 30μ in thickness can be obtained. Thereafter, an aluminum layer 27, 200μ thick is deposited on the silicon dioxide layer 25 by the evaporation method.

Figure 13:
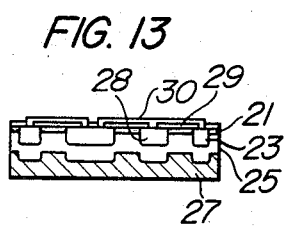
Figure 17:
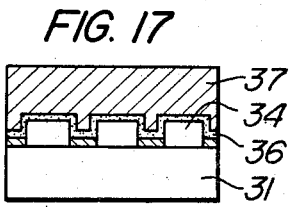

The silicon body 20 is then lapped with an abrasive to a line adjacent the line 26–26' in FIG. 12, and the vapor etching is further applied to etch the body 20 to a position of the line 26–26', with the result that the vapor growth layer 23 alone exists in the desired shape in the insulating material layer. A silicon dioxide layer 29 is then deposited on that surface on which the vapor growth layer 23 is exposed, and the method of localized diffusion of an impurity is employed to form PN junctions in the single crystalline vapor growth layer 23 to obtain mono-functional devices 28 such as transistors, resistors, or capacitors, as shown in FIG. 13. These mono-functional devices 28 are suitably connected with each other by an evaporated layer 30 of aluminum to obtain a solid circuit. It will be seen that the above-described mono-functional devices 28 are completely electrically isolated from each other by the insulating material 25 except that they are electrically connected by the evaporated aluminum layer 30.

Figure 15:
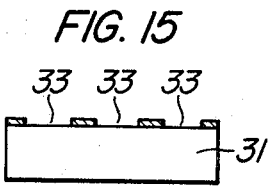
Figure 16:
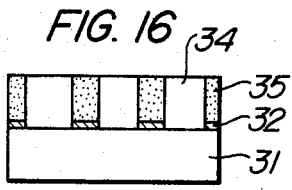

Another embodiment of the invention as adapted to a germanium substrate will next be described with reference to FIGS. 14 through 17. A germanium body 31 has its surface chemically polished and is kept at a clean state. By causing vapor of tetra-ethoxy silane to flow near the germanium body 31 while heating it to a temperature of 750° C., a silicon dioxide layer 32 deposits on the surface of the germanium body 31 by the thermal decomposition of silane. The rate of growth of this silicon dioxide layer 32 was 0.03μ per minute when the germanium body 31 was heated at 750° C. The thermal decomposition of silane is stopped when the thickness of the silicon dioxide layer 32 becomes as large as about 1μ. Then the photo-resist technique frequently employed in the field of semiconductor industry is utilized to remove predetermined portions as at 33 of the silicon dioxide layer 32 on the germanium body 31 as shown in FIG. 15 so as to expose these surface portions of the germanium body 31. Then, germanium is made to grow on the germanium body 31 by the reduction of $GeCl_4$ by hydrogen. It is needless to say that single crystalline germanium grows on the exposed portions of the germanium body 31 and polycrystalline germanium grows on the silicon dioxide layer 32. The rate of growth is about 2μ per minute when the germanium body 31 is heated to a temperature of 870° C. The hydrogen reduction of $GeCl_4$ is stopped when the vapor growth layer of germanium reaches a thickness of the order of 50μ. This state is shown in FIG. 16, in which the single crystalline vapor growth layer and the polycrystalline vapor growth layer of germanium are indicated by 34 and 35, respectively. These vapor growth germanium layers 34 and 35 are then immersed in an etchant called CP–4A. In this etchant, the single crystalline germanium and the polycrystalline germanium are etched at respective rates of about 5μ per minute and about 10μ per minute. Accordingly the etching treatment is continued for about 5 minutes in order to completely remove the polycrystalline germanium layer 35 in the vapor growth germanium layer.

After this etching treatment, the vapor growth single crystalline layer 34 is solely left on the germanium body 31. Thereafter, a silicon dioxide layer 36 is deposited on this vapor growth single crystalline layer 34 by the thermal decomposition of tetra-ethoxy silane as in the case of the deposition step shown in FIG. 12, and a silicon layer 37 is further deposited on the silicon dioxide layer 36 so that the silicon layer 37 acts as a handle crystal. The body crystal 31 is then removed by lapping with an abrasive and chemical etchant is applied to the body crystal 31 to lightly etch it to thereby completely remove those body portions which are still left even after the lapping. In the structure obtained after the above treatments, the germanium single crystals are surrounded by the insulating material or silicon dioxide layer and are completely isolated from each other by the insulating material. In making a solid circuit from this structure, the localized impurity diffusion technique well known in the art may be utilized to diffuse a predetermined impurity into the independent portions of the single crystalline germanium layer, that is, the vapor growth germanium layer 34 to form semiconductor devices, and these semiconductor devices may suitably be electrically connected with each other by means such as an evaporated conductor.

Another form of the invention preferably used with a III–V group intermetallic semiconductor, especially GaAs, will be described with reference to FIGS. 18 and 19. Since GaAs is an expensive semiconductor, it is uneconomical to use a GaAs single crystal as an original substrate and to subject it to lapping in a later step. It is accordingly necessary to seek a material suitable for the substrate on which a vapor growth layer of GaAs can freely be formed and which does not adversely affect the vapor growth layer of GaAs. A material suitable for this purpose is single crystalline germanium.

Figure 18:
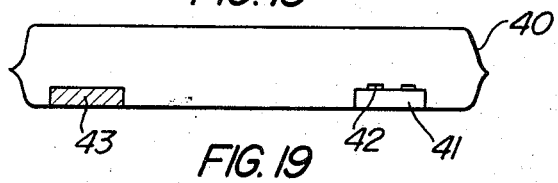
FIGS. 18 and 19 are similar explanatory views showing a case in which a GaAs substrate is used.
Figure 19:
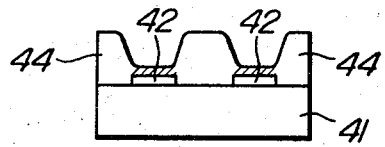

In FIG. 18, reference numeral 40 designates a closed quartz reaction tube in which iodine is enclosed at a rate of 1 mmg. per cc. A substrate 41 of single crystalline germanium is disposed in the tube 40 and has silicon dioxide films 42 deposited thereon as described in the previous embodiment. A polycrystalline mass 43 of GaAs also disposed in the tube 40 serves as a source of GaAs. When now the quartz tube 40 is placed in a suitable electric furnace so that the substrate 41 of single crystalline germanium is uniformly heated to about 700° C. and the polycrystalline mass 43 of GaAs is uniformly heated to a temperature range somewhere between 750° C. and 800° C. By this heating, single crystals of GaAs grow on the germanium substrate 41 at a growth rate of 2μ per hour. Growth of polycrystalline GaAs on the silicon dioxide films 42 varies considerably depending on temperature conditions, but the vapor growth rate of polycrystalline GaAs under the above conditions is 0.1 to 0.5μ per hour. When therefore the reaction is allowed to continue for about 3 hours under the above conditions, a single crystalline layer 44 of GaAs with a thickness of about 6 to 7μ grows on the substrate 41 of single crystalline germanium, while a layer of polycrystalline GaAs with a thickness of about 1 to 1.5μ grows on the silicon dioxide film 42. Then when the germanium substrate 41 is taken out of the tube 40 and is immersed for about 30 seconds in an etchant containing 1 part of $H_2O_2$, 18 parts of $H_2SO_4$ and 1 part of $H_2O$, the thickness of the single crystalline layer 44 of GaAs is reduced by about 1μ, while the polycrystalline layer of GaAs is completely removed, with the result that the single crystalline layer 44 of GaAs can solely be left on the substrate 41 of single crystalline germanium. This structure may thereafter be treated in a manner similar to that described with regard to the previous embodiment.

As will be apparent from the foregoing description with regard to the basic embodiments of the inventive method, electrically isolated independent deposits of a vapor growth layer of semiconductor can be disposed in desired shape in an electrically insulating material layer by evaporating a metal by use of a mask shaped to conform with the shape to be insulated or by depositing an oxide layer by use of the photo-resist method.

The electrical insulation between semiconductor devices attained by the method of the invention is remarkably excellent compared with the prior method utilizing the backward characteristic of PN junctions, and the electrical insulation by the insulating material can lower the electric capacitance so that the solid circuit thereby obtained can satisfactorily be used for a high-speed operation.

The method according to the invention is further advantageous in that semiconductor crystals utilized as semiconductor devices can be deposited at any desired thickness since they are obtained by the vapor growth of the semiconductor and that the semiconductor devices thus formed have an extremely small thickness which leads to satisfactory thermal dissipation after being mounted on a stem.

In the transistors of this kind, a high impurity concentration layer as shown by $n^+$ in FIG. 9 must be provided in order to reduce the collector saturation resistance. According to the invention, such high impurity concentration layer can easily be obtained by causing an impurity to diffuse into a single crystalline vapor growth layer when this layer is solely left on a single crystalline substrate of semiconductor after the step of etching. It is also possible to obtain transistors, diodes or the like having a high switching speed by causing a metal such as gold to diffuse into the single crystalline vapor growth layer in lieu of the above impurity.

Although the foregoing description has referred to the case of the semiconductor body of silicon and germanium, it will be understood that other semiconductor materials such as GaAs, InSb, InP, GaSb and the like may equally effectively be employed. It will also be understood that the insulating material to be deposited on the single crystalline vapor growth layer left in the form of projections is not limited to silicon dioxide, but other insulating material such as aluminum silicate glass may be satisfactorily employed.

The method according to the invention also includes a case in which a semiconductor material such as GaAs or GaP is epitaxially grown on a substrate of single crystalline germanium. In addition to the deposition of the epitaxial growth layer of semiconductor material by the hydrogen reduction of the semiconductor halogenide material, the method according to the invention also includes a case in which such epitaxial growth layer is formed by the disproportionation method well known in the art.

What is claimed is:

1. A method for manufacturing at least one electrically isolated region of a semiconductive material, comprising the steps of: preparing a monocrystalline semiconductor substrate, forming, on a surface of said semiconductor substrate, a first insulating masking layer having at least one aperture of a desired shape, causing a vaporized semiconductive material to grow on both said insulating masking layer and the exposed portion of said semiconductor substrate, whereby a monocrystalline layer of said semiconductive material is formed on said exposed portion and a polycrystalline layer of said semiconductive material is formed on said masking layer integrally with said monocrystalline layer, chemically etching both said monocrystalline layer and said polycrystalline layer simultaneously, said polycrystalline layer being completely removed, thus exposing said apertured masking layer while said monocrystalline layer is only reduced in thickness, next depositing a second layer of insulating material on the exposed surfaces of both said apertured mask layer and said monocrystalline layer, depositing a material having a high thermal conductivity upon said second insulating material layer, and then removing said semiconductor substrate, whereby said monocrystalline layer is retained on said first and second insulating layers.

2. A method for manufacturing at least one electrically isolated region of a semiconductive material according to claim 1, further comprising the steps of forming PN junctions in the vapor growth monocrystalline layer of said semiconductor material disposed in said electrically insulating material layer, and fixing electrodes of desired shape at predetermined portions of said vapor growth layer of said semiconductive material.

3. A method for manufacturing at least one electrically isolated region of a semiconductive material according to claim 1, in which said semiconductive material forming said second layer is the same material which forms said semiconductor substrate.

4. A method for manufacturing at least one electrically isolated region of a semiconductive material according to claim 1, in which said semiconductive material forming said second layer is a material different from said semiconductor forming said substrate.

5. A method for manufacturing at least one electrically isolated region of a semiconductive material according to claim 1, in which the body of said semiconductor substrate is removed by means of mechanical lapping.

6. A method for manufacturing at least one electrically isolated region of a semiconductive material according to claim 1, in which the body of said semiconductor substrate is removed by means of chemical etching.

7. A method for manufacturing at least one electrically isolated region of a semiconductive material according to claim 1, in which said vapor growth layer of a semiconductive material consists of a material different from said semiconductor substrate.

8. A method for manufacturing at least one electrically isolated region of a semiconductive material according to claim 2, in which said PN junctions are formed by means of diffusion of an impurity into said vapor growth layer of said semiconductive material.

9. A method for manufacturing at least one electrically isolated region of a semiconductive material according to claim 2, in which said PN junctions are formed by means of alloying of an impurity with said vapor growth layer of said semiconductive material.

References Cited

UNITED STATES PATENTS

| | | | |
|---|---|---|---|
| 3,189,973 | 6/1965 | Edwards et al. | 148—175 XR |
| 3,265,542 | 8/1966 | Hirshon | 148—175 |
| 3,296,040 | 1/1967 | Wigton | 148—175 |
| 3,326,729 | 6/1967 | Sigler | 148—175 |
| 3,328,216 | 6/1967 | Brown et al. | 148—187 |

OTHER REFERENCES

Electronics Review, vol. 37, No. 17, June 1, 1964, p. 23.
Electronic News, Apr. 20, 1964, p. 42.
Electronics Review, vol. 37, No. 17, June 1, 1964, p. 23.

HYLAND BIZOT, *Primary Examiner.*

DAVID L. RECK, *Examiner.*

N. F. MARKVA, P. WEINSTEIN, *Assistant Examiners.*